United States Patent [19]

Balzer

[11] Patent Number: 4,489,709
[45] Date of Patent: * Dec. 25, 1984

[54] LOUVER SOLAR PANEL

[76] Inventor: Eric Balzer, 32594 Walker Rd., Avon Lake, Ohio 44012

[*] Notice: The portion of the term of this patent subsequent to Oct. 18, 2000 has been disclaimed.

[21] Appl. No.: 483,196

[22] Filed: Apr. 8, 1983

Related U.S. Application Data

[63] Continuation of Ser. No. 277,960, Jun. 26, 1981, Pat. No. 4,409,960.

[51] Int. Cl.³ ................................ F24J 3/02
[52] U.S. Cl. .................... 126/417; 126/429; 160/107; 52/473
[58] Field of Search ............... 126/432, 417, 449, 428, 126/429; 52/473; 160/107

[56] References Cited

U.S. PATENT DOCUMENTS

| | | | |
|---|---|---|---|
| 2,288,465 | 6/1942 | Knudsen . | |
| 2,596,479 | 5/1952 | Goldstine . | |
| 2,857,634 | 10/1958 | Garbade et al. . | |
| 3,012,294 | 12/1961 | Waldor . | |
| 3,197,820 | 8/1965 | AuClaire | 52/473 |
| 3,342,244 | 9/1967 | Streeter | 160/107 |
| 3,438,167 | 4/1969 | Royston | 52/473 |
| 4,002,159 | 1/1977 | Angilletta | 126/429 |
| 4,033,326 | 7/1977 | Leitner . | |
| 4,062,346 | 12/1977 | Rapp et al. . | |
| 4,121,565 | 10/1978 | Grisbrook | 126/422 |
| 4,211,213 | 7/1980 | Nissen et al. | 126/452 |
| 4,281,639 | 8/1981 | Kuronen | 126/449 |
| 4,301,787 | 11/1981 | Rice | 126/432 |

Primary Examiner—Carroll B. Dority, Jr.
Attorney, Agent, or Firm—Watts, Hoffmann, Fisher & Heinke Co.

[57] ABSTRACT

A louver solar panel comprising spaces parallel corrugated louvers extending between channel-like side members. The louvers have flat sided adjoining corrugations the sides of which are about equal in width and are about normal to one another. The louvers are oriented at angles of about 30° with the lengths of the side members, do not overlap and have a heat absorbing surface on the sides thereof to be exposed to solar radiation.

5 Claims, 6 Drawing Figures

U.S. Patent  Dec. 25, 1984  4,489,709
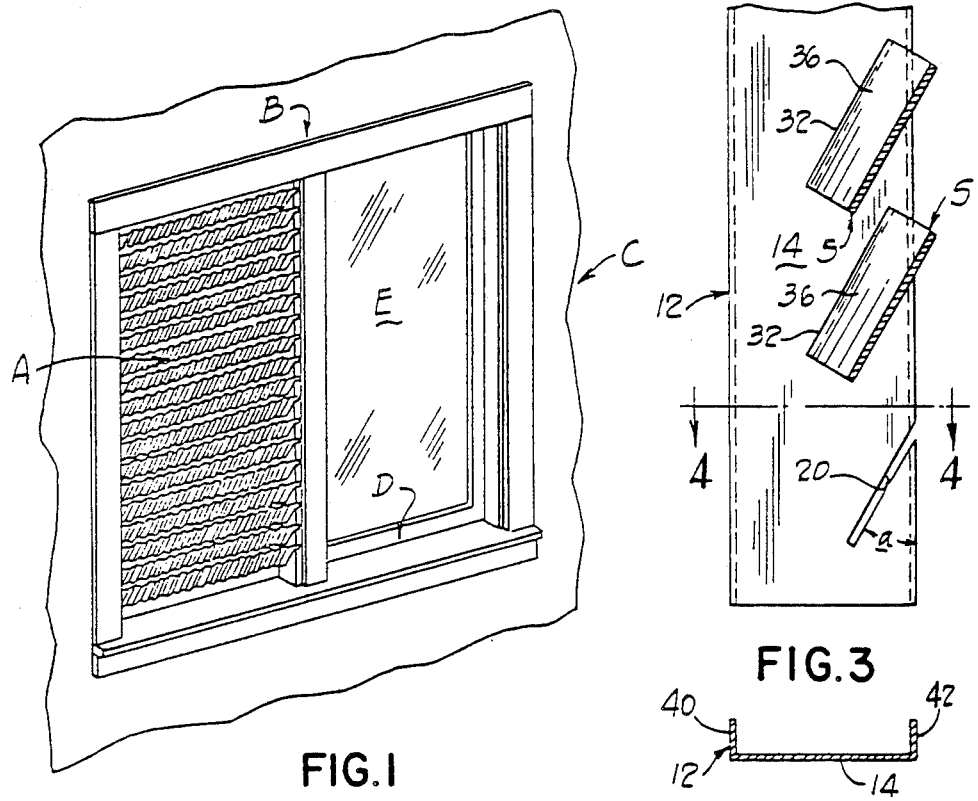
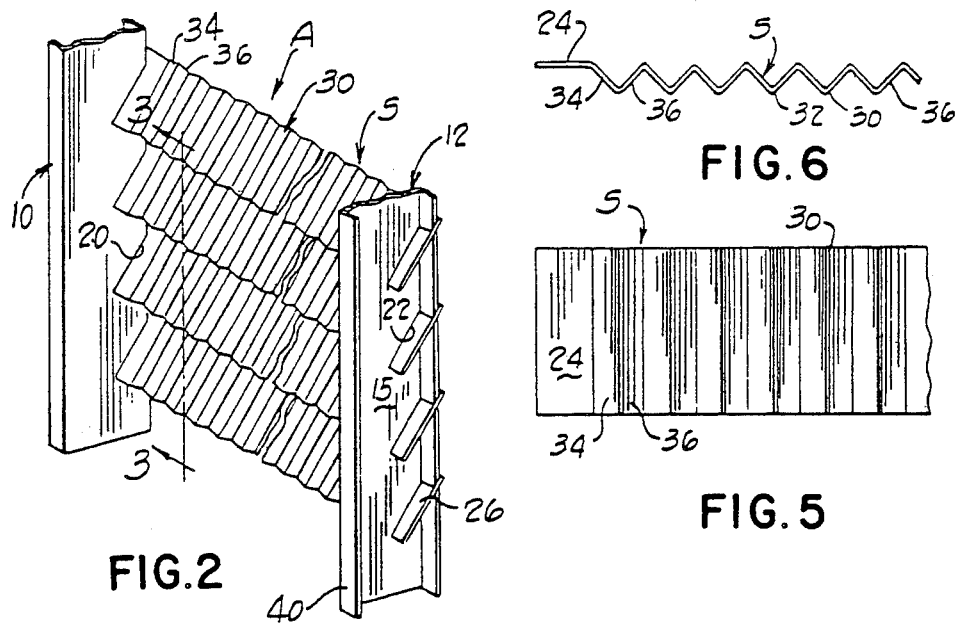

LOUVER SOLAR PANEL

This is a continuation, of application Ser. No. 277,960 filed June 26, 1981, now U.S. Pat. No. 4,409,960.

DESCRIPTION OF THE INVENTION

1. Technical Field

The invention relates to solar panels for installation in building windows for the purpose of heating an interior space in the building in the interest of fuel economy.

2. Background Art

Numerous solar panel-like structures have heretofore been proposed for the utilization of solar energy to heat interior building space in the interest of fuel economy but such prior devices are expensive to manufacture, install and maintain, fragile in construction and/or relatively inefficient.

DISCLOSURE OF INVENTION

The invention provides a novel and improved louver solar heat panel which is preferably designed for use in a window of a building and which has no moving parts, is relatively inexpensive to manufacture, easy to install and maintain and has a very high efficiency.

More specifically the invention provides a louvered solar panel having a plurality of non-overlapping parallel louvers or slats with transverse corrugations to increase the area thereof and preferably having a heat absorbing finish or coating on the sides exposed to solar radiation. The louvers or slats extend between and are preferably removably connected to channel-like side members with their heat absorbing surfaces facing in one direction.

According to another aspect of the invention, the corrugations of the louvers have flat sides of about equal width. The adjacent flat sides of the corrugations form included angles of 90° and the louvers are installed so that they slant downwardly and outwardly from the inside of the room at an angle of from 25°-30°, preferably about 30°, from the vertical. The preferred formation of the corrugations and the angle at which the louvers are installed maximize the surface area exposed to the sun's rays throughout the day and provide for efficient utilization of solar energy for space heating purposes.

The invention resides in certain constructions, combinations and arrangements of parts, and further aspects thereof will be hereinafter referred to or will be apparent from the following description of the preferred embodiment described with reference to the accompanying drawing.

BRIEF DESCRIPTION OF DRAWINGS

FIG. 1 is an interior perspective view of a solar panel of the invention installed in a building window;

FIG. 2 is a fragmentary perspective enlarged view of the lower part of the solar panel shown in FIG. 1;

FIG. 3 is a fragmentary sectional view approximately on the line 3—3 of FIG. 2 with the bottom louver removed;

FIG. 4 is a sectional view approximately on the line 4—4 of FIG. 3;

FIG. 5 is a fragmentary plan view of one of the louvers of the solar panel shown in FIG. 1 before assembly with the side members; and FIG. 6 is a plan view of the top side of the louver strip shown in FIG. 5.

BEST MODE FOR CARRYING OUT THE INVENTION

The solar panel A shown in the drawings is of the louver type and in FIG. 1 is shown installed in the left hand half of a double window B of a building C. Each half of the window B has a fixed sash D with a glass window E. The solar panel A in the left hand half of the window B is located at the inside of the sash D thereof.

The solar panel A comprises a plurality of vertically spaced parallel louvers S extending between vertical channel shaped side members 10, 12 connected to the window frame in any suitable manner with the webs 14, 16 thereof facing one another. The vertical side edges of the members 10, 12 facing the interior of the building have a plurality of vertically spaced, parallel slots 20, 22 respectively opening thereinto and inclined downwardly at angles a of about 25°−30°, with the lengths of the side members. The end portions 24, 26 of the louvers S are received in the slots 20, 22 of the members 10, 12. The portions 30 of the louvers S between the end parts 24, 26, which end parts are rather short, are corrugated transversely of the lengths of the louvers, and preferably are slightly wider than the depths of the slots 20, 22 with the result that about one-fourth to one-third of each louver extends beyond the edges of the end members 10, 12. The open ends of the slots 20, 22 permit the louvers S to be inserted after the end members 10, 12 have been attached to the window frame. When the louvers S are in place, the spacing between their lower edges and the window is about one-half the width of the members 10, 12.

In the embodiment shown, the corrugations 32 in the louvers S are continuous and flat sided with the adjacent sides 34, 36 of each corrugation being about the same in width and oriented at right angles to one another. When a solar panel having louvers with the aforementioned type of corrugations are installed in a south window, the sun shines predominantly on the flat sides 36 during the morning and on the sides 34 in the afternoon. The sides of the louvers S to be exposed to the sun are preferably coated with a heat absorbent material, such as black paint or the like, or are otherwise treated to increase their heat absorbing characteristics.

The corrugations 32 increase the area of the louvers S exposed to solar energy. The illustrated formation of the corrugations together with the angle of inclination to the vertical of from about 25° to 30° provide optimum exposure to available solar radiation throughout the day in temperate zones under normal conditions when facing south. While an angle of about 30° is preferred for temperate zones, it will be understood that the angle might be varied for different latitudes and/or different seasons of the year.

When the solar panel of the invention is installed, the upper surfaces of the louvers S incline downwardly and outwardly from the inside of the room. As the louvers become heated by absorption of solar energy, cool air is drawn into the solar panel at the bottom of the window and is heated between the louvers S. The heated air flows out into the room from between the louvers S along nearly the entire height of the panel, and there is little vertical air flow in contact with the window. Heat losses to the window are minimized. In direct sunlight, the louvers S may reach a temperature of 120° F. or higher with the result that a panel installed in a single window is sufficient to heat a moderate size room. It will thus be seen that the invention provides a very effective and efficient means of utilizing solar energy for space heating.

In the illustrated and preferred construction, the width of the louver S is about 2¼ inch, the width of each flat side 34, 36 of the corrugations 32 about ½ of an inch and the heights of the corrugations about ¾ of an inch. The widths of the side members 10, 12 are about 2½ inches and the heights of their flanges 40, 42 are about ½ of an inch. The slots 20, 22 opening into the one vertical sides of the members 10, 12 are about 2¼ inches apart and are about 1¾ of an inch deep. While the stated sizes are not critical, solar panels having sizes proportional to those mentioned have proved to be very efficient.

Reference to FIG. 3 will show that in the depicted solar panel the louvers S do not overlap and that the horizontal projections thereof adjoin or just about adjoin one another. This is not critical, but it provides a restricted normal view through the panel from within the building, while providing a more limited normal view in the other direction.

Referring to the depicted embodiment of the invention, the side members 10, 12 are first installed in the window or other opening in which the lower panel is to be employed. Thereafter, the louvers S are inserted in the slots 20, 22 in the members 10, 12. The louvers can be fixed in the members 10, 12 if desired, but are preferably readily removable for periods when use of the panel may not be advantageous. During such periods the louvers may be turned upside down to reflect rather than absorb solar energy.

From the foregoing it will be apparent that the objects of the invention heretofore mentioned and others have been accomplished and that a solar panel have been provided which is simple in construction, inexpensive to manufacture, easy to install and maintain, has no moving parts to service and is highly efficient.

While the preferred embodiment has been described in detail, the invention is not limited to the depicted solar panel as it may be otherwise embodied and it is the intention to hereby cover all adaptations and uses thereof which come within the practice of those skilled in the art to which the invention relates and the scope of the appended claims.

I claim:

1. A solar heating assembly suitable for mounting interiorly of a window opening, comprising:
   (a) at least two vertical support members, each member including an inner edge for orientation towards a source of solar energy and an outer edge spaced therefrom, and a web section connecting said inner and outer edges;
   (b) said members having vertically spaced, parallel louver receiving slots in said webs extending downwardly from said outer edges toward said inner edges, said slots opening at said outer edges and terminating short of said inner edges, and the slots of one member being is substantially parallel alignment with the slots of the other member; and,
   (c) a plurality of transversely extending corrugated louvers removably supportable in said slots of the vertical members, said louvers being slidably supported in said slots, said louvers being selectively removable and having their upper surfaces treated with a heat absorbing material and the lower surfaces being reflective of solar radiation and being corrugated transversely of their lengths to form a series of adjacent flat sections, the included angle between adjacent flat sections being substantially 90°.

2. The solar heating assembly of claim 1 wherein ends of said louvers are configured so that the louver can be reversed in said slots so that said reflective surfaces reflect solar energy, when desired.

3. The solar heating assembly of claim 1 wherein the weight of said louvers maintains their positions in said slots.

4. A solar heating assembly mounted interiorly of a building, comprising:
   (a) at least two vertical support members fixedly positioned inside a window opening;
   (b) each member including vertically spaced, louver mounting means, the mounting means of one member being in substantially parallel alignment with the mounting means of the other member;
   (c) a plurality of corrugated louvers extending between and removably mounted in the mounting means of said vertical support members, the weight of said louvers maintaining their positions in said mounting means, said louvers being selectively removable and having upper and lower longitudinal edges, and louvers and said vertical support members being in open communication with the interior of said building;
   (d) said louvers having their upper surfaces treated with a heat absorbing material and being corrugated transversely of their lengths to form a series of adjacent flat sections, joined at a predetermined angle, said predetermined angle being substantially 90°; and,
   (e) said louvers being inclined downwardly towards a window in said window opening when supported by said mounting means to present the maximum surface area to solar energy transmitted through said window opening, said lower longitudinal edges being nearer said window than said upper longitudinal edges so that air in the region between said window and said lower longitudinal edges of said louvers travels from said region along a path defined between adjacent louvers, rising upwardly along said upper surfaces to enter the interior of said building.

5. A solar heating assembly mounted interiorly of a building, comprising:
   (a) at least two vertical support members fixedly positioned inside a window opening;
   (b) said vertical support members each having an inner edge disposed adjacent a window in said window opening, an outer edge spaced away from said window, and a web connecting said inner and outer edges;
   (c) said members having vertically spaced, parallel louver receiving slots in said webs extending downwardly from said outer edges toward said inner edges, said slots opening at said outer edges and terminating short of said inner edges, and the slots of one member being in substantially parallel alignment with the slots of the other member;
   (d) a plurality of louvers extending between and removably inserted in associated slots of said vertical support members, said louvers being slidably supported in said slots, the weight of said louvers maintaining their positions in said slots; and,
   (e) said louvers having their upper surfaces treated with a heat absorbing material and being corrugated transversely of their lengths to form a series of adjacent flat sections, joined at a predetermined angle, said predetermined angle being substantially 90°.

* * * * *